United States Patent [19]

Weidinger et al.

[11] 4,376,330
[45] Mar. 15, 1983

[54] FLEXURE-RESISTANT CALENDER ROLL

[75] Inventors: Hans Weidinger, Putzbrunn; Werner Ehm, Dachau; Josef Pav, Krefeld, all of Fed. Rep. of Germany

[73] Assignee: Kleinwefers GmbH, Krefeld, Fed. Rep. of Germany

[21] Appl. No.: 191,691

[22] Filed: Sep. 29, 1980

[51] Int. Cl.$^3$ .......................... B21B 13/02; B21B 13/14
[52] U.S. Cl. ............................... 29/116 AD; 100/168; 100/917
[58] Field of Search ...... 29/116 R, 116 AD, 113 AD; 100/168, 917

[56] References Cited

U.S. PATENT DOCUMENTS

| | | | |
|---|---|---|---|
| 1,732,042 | 10/1929 | Fox | 100/917 |
| 2,766,559 | 10/1956 | Pixley | 28/122 |
| 3,456,582 | 7/1969 | McClenathan | 29/116 AD |
| 4,290,353 | 9/1981 | Pav | 29/116 AD |
| 4,301,582 | 11/1981 | Riihinen | 29/116 AD |

OTHER PUBLICATIONS

SKF Technische Information Nr. 299, pp. 1–12, 4–1977.

Primary Examiner—Neil Abrams
Attorney, Agent, or Firm—Kontler, Grimes & Battersby

[57] ABSTRACT

A calender roll has a hollow cylinder which surrounds or is surrounded by a stationary support. That surface of the support which faces the cylinder has circumferential and axially parallel grooves for the coils of electromagnets which are energizable independently of each other or simultaneously and serve to prevent flexing and/or other deformation of the cylinder when the latter rotates and contacts a running web of paper, textile material or metallic or plastic foil. Those sections of the aforementioned surface of the stationary support which are surrounded by the coils constitute portions of circumferentially extending arcuate or annular pole faces and the polarity of each circumferentially extending pole face is constant. However, the polarities of neighboring pole faces the different, i.e., pole faces which constitute south and north poles alternate with each other, as considered in the axial direction of the calender roll. The cylinder can be subjected to controlled heating action by splitting the circumferentially extending pole faces, by connecting some or all of the coils to sources of a-c current, by varying the extent of excitation of the coils and/or by a combination of two or more of these methods.

30 Claims, 5 Drawing Figures

FLEXURE-RESISTANT CALENDER ROLL

BACKGROUND OF THE INVENTION

The present invention relates to calenders or analogous machines in general, and more particularly to improvements in calender rolls or analogous rotary bodies which consist, at least in part, of magnetizable material. Still more particularly, the invention relates to improvements in calender rolls or analogous rotary bodies which are equipped with means for preventing, controlling or reducing the extent of flexure or bending of their components.

It is well known that the rotary component (e.g., a hollow cylinder) of a calender roll tends to flex in the middle owing to its weight as well as in response to the pressure which is applied by the rotary component(s) of the neighboring roll(s) and/or by the material (e.g., a paper web) which is caused to run through the nip of two neighboring calender rolls in a paper processing line. The extent of flexure of the rotary component can be quite pronounced, especially when the roll is long and very heavy. Such rolls are often employed in calenders for surface treatment of running paper webs as well as in machines or production lines which turn out and/or process webs, strips or tapes consisting of metallic foil, plastic foil or textile material. Flexing of the rolls is evidently undesirable when the thickness of a running web is to remain constant, as considered in the axial direction of the rotary body, regardless of whether the running web is to be smoothed, condensed, provided with a pattern, heated, cooled and/or subjected to two or more simultaneous treatments. In most instances, flexing of the rotary body causes a reduction of the thickness of a running web in one or more regions between its marginal portions.

It is already known to provide a calender roll or an analogous rotary body with means for opposing the flexure of its rotary component, e.g., the flexure of the hollow rotary cylinder which surrounds the supporting shaft of a calender roll. For example, such means may include a device which establishes a high-pressure hydraulic field between a stationary shaft and a rotary cylinder which surrounds the shaft with clearance. It has been found that such proposal is reasonably satisfactory when the RPM of the cylinder is relatively low. However, when the cylinder is driven at an elevated speed, the viscosity of the hydraulic fluid disturbs the aforementioned pressure field to such an extent that the field is incapable of preventing or adequately reducing the bending or flexing of the median portion of the cylinder.

It was further proposed to prevent or reduce the extent of flexure of a hollow rotary cylinder which surrounds a fixed stationary shaft by installing a row of discrete magnets at the underside of the shaft. The row is parallel to the axis of the shaft and the magnets tend to lift the rotary cylinder so that the lowermost portion of the cylinder tends to move radially of and toward the peripheral surface of the shaft. However, when the cylinder rotates, the roll causes the generation of pronounced eddy currents which counteract at least part of the magnetic compensating (flexure reducing or preventing) force and lead to often undesirable as well as uncontrolled heating of the cylinder.

It is further known to construct magnetic bearings for rotary shafts or the like in such a way that each bearing comprises a magnetic supporting member for a series of electromagnets, as considered in the circumferential direction of the shaft. The pole faces of neighboring electromagnets (as considered in the circumferential direction of the shaft) exhibit different polarities. Reference may be had to the German-language publication entitled "SKF Technische Information Nr. 299" (dated Apr. 12, 1977). The just described bearing structure cannot be used in a calender roll or the like to prevent flexure of a rotary component because, when the shaft rotates in the aforementioned magnetic bearings, the alternating pole faces of different polarities cause a reversal of the field which entails considerable losses as a result of development of eddy currents. Such losses (which are attributable to development of eddy currents) can be kept within a certain range by resorting to feedback connectors of iron, sheet metal or the like; however, they cannot be eliminated in full and their remnants are sufficiently pronounced to cause excessive heating of a cylinder which forms part of a calender roll for the treatment of running webs of paper, textile material, metallic foils, plastic foils or laminates consisting of two or more superimposed bands, sheets or strips.

OBJECTS AND SUMMARY OF THE INVENTION

An object of the invention is to provide a novel and improved system for prevention of or for controlled bending of rotary bodies including the cylinders of calender rolls or the like.

Another object of the invention is to provide a system of the just outlined character wherein the rotary body is held by magnetic means against any or against excessive bending.

A further object of the invention is to provide a simple, compact, inexpensive and highly versatile system for preventing uncontrolled bending of cylinders in calender rolls or the like.

An additional object of the invention is to provide a system of the above outlined character which does not adversely influence the rotary component irrespective of the RPM of such component, which can be installed in existing calenders or analogous machines as a superior substitute for conventional flexure preventing or reducing systems, and which need not generate any (or generates only desirable) eddy currents when the rotary component is in motion.

A further object of the invention is to provide a calender roll which embodies the above outlined system.

Another object of the invention is to provide a system which can be operated in such a way that the characteristics (e.g., the thickness) of the material which is treated by the rotary component can be regulated within any desired practical range. For example, the system may be designed to cause a variation in the thickness or density of a running paper or textile web as considered in the direction from one toward the other marginal portion of the web.

The invention is embodied in the combination of a stationary component (e.g., a shaft which is fixedly mounted in a frame or a calender or a hollow stationary support having a substantially horseshoe-shaped cross-sectional outline) and a rotary component (e.g., a hollow cylinder which surrounds the aforementioned shaft with clearance or which is surrounded with clearance by the aforementioned hollow stationary support) which consists, at least in part, of magnetizable material. For example, both components may be made of steel.

One of the components surrounds at least a portion of the other component and the internal surface of the one component defines with the external surface of the other component an arcuate air gap. The stationary component includes or forms part of magnet means or magnets which serve to prevent or counteract excessive or uncontrolled flexing of the rotary component when the machine or production line in which the two components are installed is put to use. The magnets include arcuate pole faces (each such pole face may constitute an annulus) and each pole face extends in the circumferential direction of the rotary component. The polarity of any one of the arcuate pole faces is the same in each region of the respective pole face, and the polarity of each arcuate pole face is different from that of the neighboring pole face or pole faces. In other words, arcuate pole faces of dissimilar polarities alternate with each other, as considered in the axial direction of the rotary component. The stationary component can be said to constitute the core of the magnets, and each magnet may constitute an electromagnet, i.e., each magnet can have a coil which surrounds a portion of the core and a section of an arcuate pole face. The structure of the present invention further comprises means for energizing the coils of the electromagnets. If the stationary component is surrounded by the rotary component, the pole faces form part of the peripheral or external surface of the stationary component. The pole faces form part of the internal surface of the stationary component if the latter surrounds a portion of the rotary component.

The novel features which are considered as characteristic of the invention are set forth in particular in the appended claims. The improved combination itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
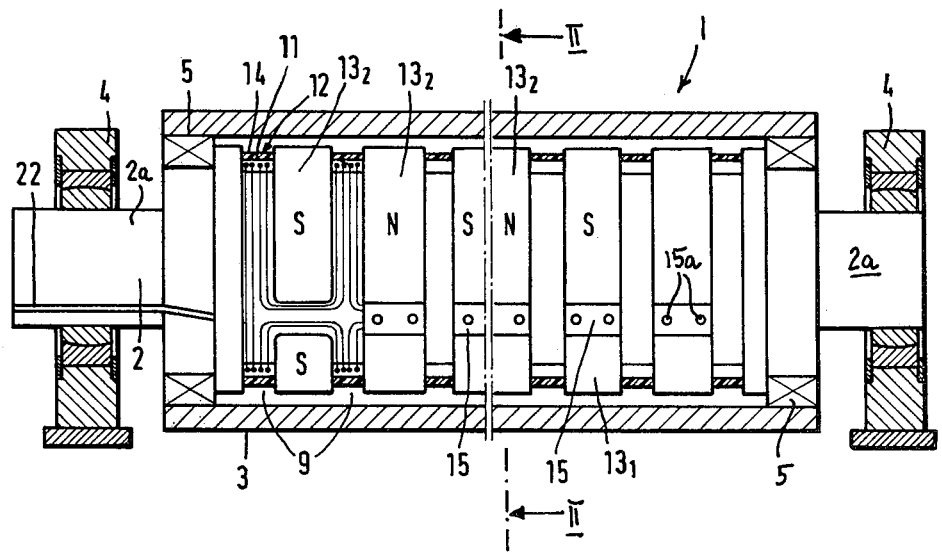
FIG. 1 is a somewhat schematic fragmentary axial sectional view of a calender roll which is constructed and assembled in accordance with a first embodiment of the invention.

In the embodiment of FIGS. 1 to 4, the calender roll 1 comprises a stationary component 2 which constitutes a fixedly mounted shaft and a rotary component here shown as a hollow cylinder or sleeve 3 which surrounds the shaft 2. The end portions 2a of the shaft 2 are installed in bearing members 4 forming part of the frame of a calender wherein the roll 1 constitutes one of several superimposed rolls. Reference may be had to commonly owned copending application Ser. No. 83,632 filed Oct. 11, 1979 for "Method and apparatus for rapidly separating the rolls of a calender" (now U.S. Pat. No. 4,290,351) or to commonly owned copending application Ser. No. 54,614 filed July 3, 1979 for "A rapid-separation mounting arrangement for rollers of a calendering machine" (now U.S. Pat. No. 4,311,091). The cylinder 3 is rotatable on antifriction roller bearings 5 which are interposed between the end portions of the cylinder and the adjacent portions of the shaft 2. The components 2 and 3 consist of steel. It is clear that the roller bearings 5 constitute but one form of means for reducing friction when the cylinder 3 is caused to rotate relative to the shaft 2.

Figure 2:
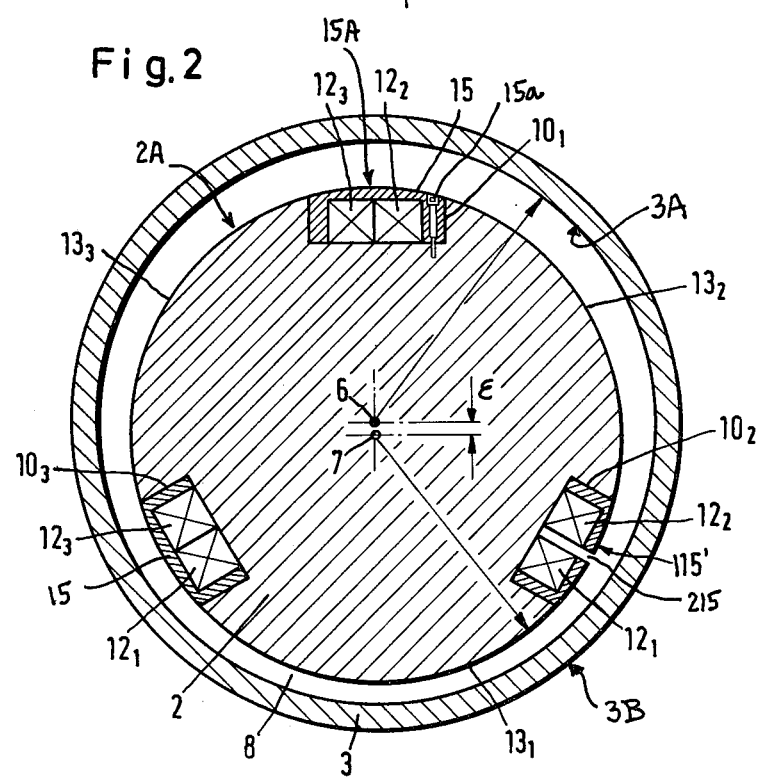
FIG. 2 is an enlarged transverse sectional view as seen in the direction of arrows from the line II—II of FIG. 1.

As shown in FIG. 2, the axis 6 of the hollow cylinder 3 is parallel to and located at a level above the axis 7 of the stationary shaft 2. The distance $\epsilon$ denotes the extent of eccentricity of the cylinder 3 with respect to the shaft 2. The width of the annular air gap 8 between the internal surface 3A of the cylinder 3 and the external or peripheral surface 2A of the shaft 2 varies owing to the aforementioned eccentricity of the cylinder 3, i.e., the width of the gap 8 is maximal at the twelve o'clock position and minimal at the six o'clock position, as viewed in FIG. 2.

The peripheral surface 2A of the shaft 2 is formed with a series of relatively shallow endless circumferential grooves 9 which are equally spaced apart from each other, as considered in the axial direction of the shaft. Each pair of neighboring grooves 9 is connected by three equidistant axially parallel relatively shallow additional grooves $10_1$–$10_3$, i.e., the distance between two neighboring additional grooves $10_1$–$10_3$ (as considered in the circumferential direction of the surface 2A) is 120 degrees. The topmost grooves $10_1$ form a first file of aligned grooves at the twelve o'clock position, as viewed in FIG. 2. The right-hand grooves $10_2$ (as viewed in FIG. 2) form a second file of aligned grooves at the four o'clock position, and the left-hand grooves $10_3$ (as viewed in FIG. 2) form a third file of aligned grooves at the eight o'clock position. Each of the two planes which respectively halve the grooves $10_2$ and $10_3$ and include the axis 7 of the shaft 2 makes an angle of 60 degrees with the plane which halves the grooves $10_1$ and also includes the axis 7 of the shaft 2.

The grooves 9 and $10_1$–$10_3$ confine the turns or windings 11 of coils 12 forming part of electromagnets which serve to prevent or reduce the extent of flexing of the central portion of the cylinder 3 when the calender roll 1 is in use. The arrangement is such that the windings 11 of each coil 12 extend around a section of the peripheral surface 2A which is bounded by two neighboring circumferential grooves 9 and two neighboring axially parallel additional grooves $10_1$, $10_2$ or $10_1$, $10_3$ or $10_2$, $10_3$. This can be readily seen in FIG. 4 which shows a portion of the shaft 2 and several grooves 9 and $10_1$–$10_3$ whose depth has been exaggerated for the sake of clarity. The just mentioned sections of the peripheral surface 2A constitute portions of pole faces of electromagnets which include the coils 12. The pole faces $13_1 + 13_2 + 13_3$ are elongated and arcuate, as considered in the circumferential direction of the shaft 2, and the polarity of each set of three aligned sections $13_1$, $13_2$, $13_3$ (again, as considered in the circumferential direction of the shaft 2) is the same.

Figure 4:
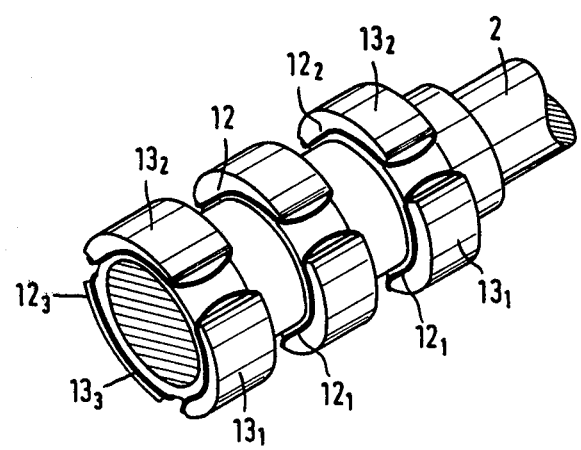
FIG. 4 is a fragmentary perspective view of the stationary supporting component of the roll which is shown in FIGS. 1 and 2.

The coils $12_1$ which extend into the grooves $10_2$ and $10_3$ (i.e., those coils which are adjacent to the narrowest portion of the gap 8) can be said to constitute supporting or carrying coils. The coils $12_2$ which extend into the grooves $10_1$ and $10_2$ can be said to constitute front lateral coils, and the coils $12_3$ which extend into the grooves $10_1$ and $10_3$ can be said to constitute rear lateral coils of the means for preventing or reducing the extent of flexure of the cylinder 3. Of course, and as shown in FIGS. 1, 2 and 4, each of the coils $12_1$, $12_2$ and $12_3$ further extends into two neighboring circumferential grooves 9. The pole faces including the sections $13_1$, $13_2$ and $13_3$ (i.e., sections of the peripheral surface 2A) are respectively surrounded by the coils $12_1$, $12_2$ and $12_3$.

The coils $12_1$ to $12_3$ are connected with a suitable energy source by way of conductors which extend through or are recessed into the shaft 2. FIG. 1 shows a channel 22 in the left-hand end portion 2a of the shaft 2; the channel 22 confines conductor means (shown in FIG. 3) for connecting the carrying coils $12_1$ with the energy source. Similar or analogous channels or bores are provided in or on the shaft 2 for conductors which connect the energy source or sources with the lateral coils $12_2$ and $12_3$.

Those portions of the coils $12_1$ to $12_3$ which extend into the circumferential grooves 9 are overlapped and concealed by sealing bands 14 (see FIG. 1) which consist of magnetically permeable material. The remaining portions of the coils $12_1$ to $12_3$ (namely, those extending into the additional grooves $10_1$ to $10_3$) are held by U-shaped retaining clamps or bridges 15 consisting of magnetic material. The clamps 15 are secured to the shaft 2 by screws 15a or other suitable fastener means. The exposed outer sides or surfaces 15A of the clamps 15 are flush with the peripheral surface 2A (see FIG. 2).

The manner in which the sets of aligned coils $12_1$–$12_3$ (as considered in the circumferential direction of the shaft 2) are connected to the source or sources of energy is such that the polarity of the corresponding (circumferentially aligned) sections $13_1$–$13_3$ is the same. Furthermore, the polarity of neighboring arcuate pole faces including sections $13_1$ to $13_3$ (as considered in the axial direction of the shaft 2) is different. Thus, and referring to FIG. 1, the sections $13_1$ to $13_3$ of the leftmost pole face constitute a south pole (S), the sections of the next-to-the-leftmost pole face constitute a north pole (N), the sections of the third leftmost pole face constitute a south pole, and so forth.

Figure 3:
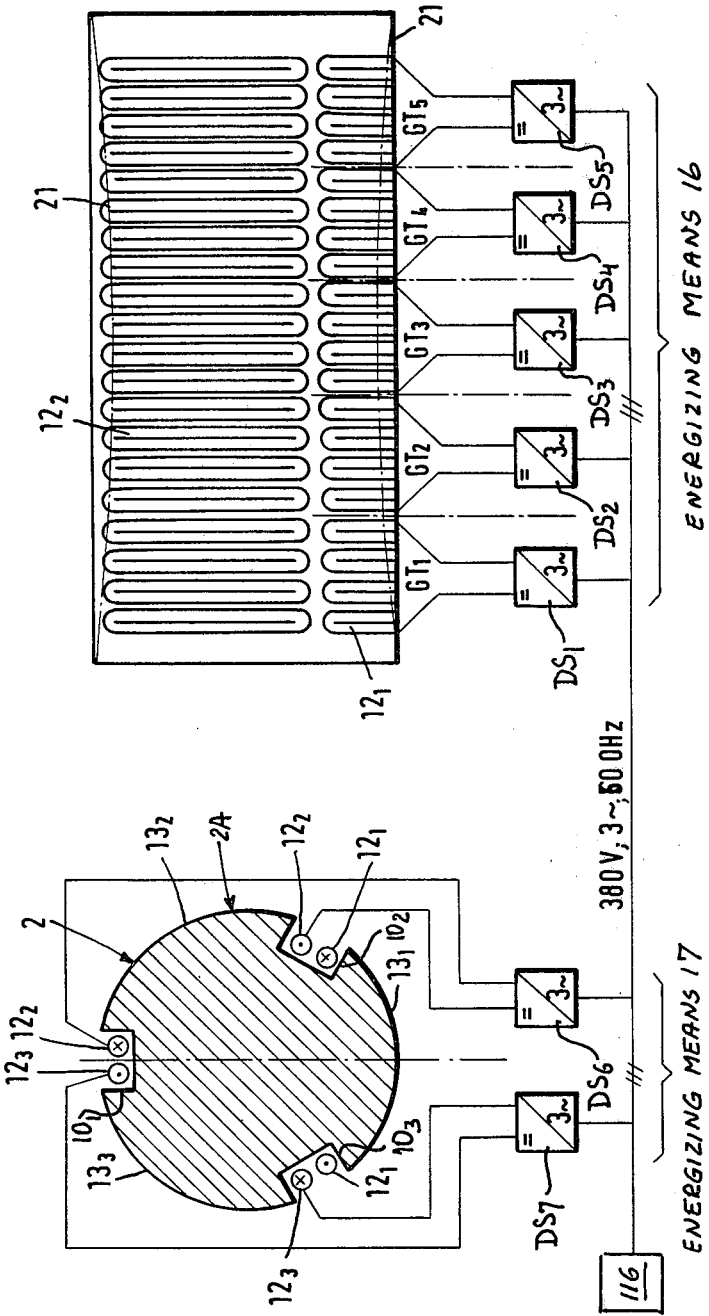
FIG. 3 is a diagram of electrical components of the calender roll which is shown in FIGS. 1 and 2.

As shown schematically in FIG. 3, the carrying coils $12_1$ are subdivided into several groups of four coils $12_1$ each. The cylinder 3 confines five groups $GT_1$, $GT_2$, $GT_3$, $GT_4$, $GT_5$ of coils $12_1$, and the coils of each group can be energized or deenergized independently of the coils of one or more other groups. The coils $12_1$ of each of the groups $GT_1$ to $GT_5$ are connected with discrete sources $DS_1$ to $DS_5$ of d-c current, and these sources together constitute or form part of a means 16 for energizing the carrying coils $12_1$ of one or more groups GT. The energizing means 16 connects the sources $DS_1$ to $DS_5$ with a source 116 of multiphase current (three-phase, 380 volts, 60 hertz).

The source 116 is further connected with sources $DS_6$ and $DS_7$ of d-c current for the groups of front and rear lateral coils $12_2$ and $12_3$. These d-c current sources form part of two discrete energizing means 17 shown in FIG. 3. The lateral coils $12_2$ and/or $12_3$ can also form five groups of four coils each; however, this is not absolutely necessary in each and every calender roll which embodies the present invention.

In normal operation of the calender which includes the roll 1 of FIGS. 1, 2 and 4, the energizing means 16 and 17 supply d-c current to the respective coils $12_1$ to $12_3$ whereby the coils $12_1$ control the flexing of the cylinder 3 in such a way that the thickness of a web of paper or the like which passes between the peripheral surface 3B of the cylinder 3 and the peripheral surface of an adjoining cylinder (not shown), i.e., through the nip of two neighboring calender rolls, is constant or varies at a desired rate (as considered in the axial direction of the cylinder 3). At the same time, the coils $12_2$ and $12_3$ compensate for (i.e., oppose) pressure-induced deformation of the cylinder 3 as well as deformation which arises or tends to arise for other reasons.

The coils $12_1$ and/or $12_2$ and/or $12_3$ can be distributed and/or energized in such a way that they relieve the stresses upon the antifriction bearings 5 between the shaft 2 and cylinder 3. In fact, the distribution and sequence or pattern of energization of coils $12_1$ to $12_3$ can be such that the bearings 5 can be omitted; the cylinder 3 then merely floats around the stationary shaft 2.

The shaft 2 is also subjected to stresses when the roll 1 is in use. Thus, the median portion of the shaft 2 tends to flex downwardly under the weight of the material of the shaft. Moreover, tensional stresses which arise in response to energization of some or all of the coils $12_1$ to $12_3$ also tend to bend the median portion of the shaft 2. Such bending or flexing of the shaft 2 can be opposed or compensated for by imparting to the shaft the configuration of a rotary paraboloid (as indicated in FIG. 3 by the broken lines 21) with a concave peripheral surface. In other words, the diameter of the peripheral surface can decrease gradually from both axial ends toward the center of the shaft. When the coils are energized, the electromagnets ensure such deformation of the rotary paraboloid that the width of the gap portion between such paraboloid and the cylinder at the six o'clock position of the cylinder is constant or nearly constant (as considered in the axial direction of the roll).

FIG. 2 shows that the one-piece U-shaped retaining bridges or clamps 15 can be replaced by or used together with pairs of slightly spaced-apart slotted bridges or clamps 115' each of which resembles an L-shaped body. The clearances 215 between the clamps 115' interrupt the composite pole faces (as considered in the circumferential direction of the shaft 2). When the cylinder 3 rotates, the clearances 215 induce therein eddy currents which can heat the cylinder to a desired temperature (provided that such heating is desirable for more satisfactory treatment of the web which advances between the peripheral surface 3B of the cylinder 3 and the peripheral surface of an adjoining cylinder when the calender is in use). In addition to or instead of the just described mode of heating the cylinder 3, the latter can be subjected to an accurately controlled heating action in a number of other ways, e.g., by regulating the extent of energization of the coils $12_1$ and/or $12_2$ and/or $12_3$ (i.e., by varying the excitation from coil to coil or from group of coils to group of coils), by supplying some or all of the coils with a-c current, and/or by appropriate selection of polarity of the coils.

An important advantage of the improved roll is that each of the composite pole faces $13_1$, $13_2$, $13_3$ may have the same polarity as considered in the circumferential direction of the shaft 2 or cylinder 3 (the parts $13_1$ to $13_3$ can be said to constitute sections of a composite arcuate pole face which is annular in the embodiment of FIGS. 1, 2 and 4 because the pole faces form part of the peripheral or external surface 2A of the shaft 2, i.e., of a stationary component which is surrounded by the rotary component or cylinder 3). This constitutes an important and highly advantageous improvement over conventional constructions which utilize magnetic bearings for rotary components and wherein pole faces or sections of pole faces of different polarities alternate with each other, as considered in the circumferential direction of the rotary component. Each of the sections $13_1$, $13_2$, $13_3$ preferably extends along a relatively long arc, as considered in the circumferential direction of the shaft 2 or cylinder 3, so as to avoid a reversal of the field when the cylinder 3 is caused to rotate. Consequently, the intensity of eddy currents which develop when the cylinder 3 rotates is negligible so that the cylinder cannot be subjected to undesirable, unpredictable and/or excessive heating action when the roll 1 is in use. It has been found that losses due to development of eddy currents or the like are practically nil when compared with losses which arise when a rotary body rotates relative to one or more magnets having pole faces whose polarity varies in the circumferential direction of the rotary component.

As mentioned hereinabove, the shaft 2 can be said to constitute a stationary core of the electromagnets which include the coils $12_1$, $12_2$ and $12_3$. Each of these electromagnetic coils extends into two neighboring circumferential or arcuate grooves 9 as well as into two of the respective additional or axially parallel grooves $10_1$-$10_3$, namely, into two of the three grooves $10_1$-$10_3$ which extend between and communicate with two neighboring grooves 9. In the embodiment of FIGS. 1, 2 and 4 (in which each pair of neighboring grooves 9 is connected to each other by three equidistant axially parallel additional grooves $10_1$, $10_2$ and $10_3$), each composite arcuate (annular) pole face consists of three sections $13_1$, $13_2$, $13_3$ each of which extends along a relatively long arc (120 degrees), as considered in the circumferential direction of the shaft 2 or cylinder 3. Each of the sections $13_1$ of each of the composite pole faces is surrounded by a coil $12_1$ having two halves which are disposed at the opposite sides of a plane (this is the vertical plane which includes the axes 6 and 7 shown in FIG. 2) wherein portions of the axis 6 of the cylinder 3 move when the latter flexes or bends while the roll 1 is in use in a calender or the like. The coils $12_1$ form a first row which extends in parallelism with the axes 6 and 7, and the coils $12_2$ and $12_3$ form two additional rows which also extend in parallelism with the axes 6 and 7 and flank the row of coils $12_1$. The retaining clamps 15 constitute magnetic bridges between the neighboring sections $13_1$, $13_2$ and $13_3$ of an arcuate (annular) pole face, i.e., of a pole face whose polarity is constant all the way, as considered in the circumferential direction of the shaft 2. Absence of interruptions in the pole faces is desirable for the aforementioned reason, i.e., if one desires to avoid the development of any eddy currents or if such eddy currents are to be reduced to a minimum so that the cylinder 3, and hence the running web or webs which are contacted by the surface 3B of the cylinder, are not subjected to excessive or uncontrolled heating action.

The provision of the energizing means 16 and 17 which are shown in FIG. 3 is desirable and advantageous because the resistance of the cylinder 3 to bending or flexing stresses (and/or the extent to which the cylinder 3 is allowed to flex) can be regulated with a very high degree of accuracy. This is made possible because at least the energizing means 16 allows for independent energization of the coils $12_1$ of two or more of the groups $GT_1$ to $GT_5$, and also because the energizing means 17 allow for independent energization of coils $12_2$ and $12_3$ relative to the coils $12_1$ and/or for energization of the coils $12_2$ or $12_3$ independently of the coils $12_3$ or $12_2$ and/or $12_1$.

The placing of the axis 6 of the rotary component or cylinder 3 at a level above the axis 7 of the shaft 2 is desirable and advantageous in many instances because, if the axis 7 were to coincide with the axis 6, it would be necessary to effect a more pronounced energization of the coils $12_1$ and less pronounced energization of the coils $12_2$ and $12_3$. This is the case when the energizing means 16 for the groups $GT_1$ to $GT_5$ of coils $12_1$ can be actuated independently of the energizing means 17 for the coils $12_2$ and $12_3$ and when the width of the air gap 8 is constant along the entire circumference of the shaft 2, i.e., when the axis 7 coincides with the axis 6. The electromagnets including the coils $12_2$ and $12_3$ serve primarily to prevent excessive deformation of the cylinder 3 as well as to maintain the magnetic field.

When the axis 7 is located at a level below the axis 6 (as shown in FIG. 2), satisfactory magnetic compensation for flexing of the cylinder 3 by the electromagnets including the coils $12_1$ can be accomplished by exciting all of the coils $12_1$ to the same extent. This is due to the fact that the width of the air gap 8 in the region of the coils $12_1$ is less than the width of those portions of the gap 8 which are adjacent to the coils $12_2$ and $12_3$. Since the tensional force (in the case of identical energization of an entire row of coils) is proportional to the reciprocal of the square of the air gap, the electromagnets including the coils $12_1$ generate a force which is directed upwardly, as viewed in FIG. 2 and pulls the lowermost portion of the cylinder 3 toward the row of coils $12_1$. At the same time, losses due to the generation of eddy currents are held to a minimum.

As mentioned hereinabove, the generation of some eddy currents (in an accurately controlled manner) may be desirable in certain instances, for example, if the nature of running webs is such that their treatment is enhanced by maintaining the rotary component 3 at a given temperature, i.e., by heating the cylinder 3 to a predetermined temperature. The generation of eddy currents for controlled heating of the cylinder 3 can be achieved by resorting to the split magnetic bridges or clamps 115' of FIG. 2 and/or in a number of other ways. For example, the coils $12_1$, $12_2$ and $12_3$ of a series of coils extending circumferentially of the shaft 2 can be excited to a different extent; this brings about a controlled buildup and collapse or reduction of intensity of the magnetic field during rotation of the cylinder 3. The variations in intensity of the field are used almost exclusively for the generation of heat in the cylinder 3. A third possibility for heating the cylinder 3 includes arranging the coils $12_1$, $12_2$ and $12_3$ of a series of such coils (as considered in the circumferential direction of the shaft 2) in such a way that the polarity varies from coil to coil. Therefore, when the cylinder 3 rotates, there takes place a change of polarity in each pole face, as considered in the circumferential direction of the cylinder, and hence also a controlled reversal of the magnetic field. This, too, results in heating of the cylinder 3 to a desired temperature.

If the cylinder 3 is heated by resorting to split clamps 115' of the type shown in the lower right-hand portion of FIG. 2, the width of the clearances 215 between the two halves of each clamp 115' will determine the intensity of the heating action. Finally, it is also possible to heat the cylinder 3 by connecting at least some of the coils 12 to a source of a-c current. It is clear that two or more of the just enumerated means for heating the component 3 can be combined in one and the same calender roll or a like device. All that counts is to ensure, when necessary, that the temperature of the rotary component can be maintained within a desired range or at a given value.

Figure 5:
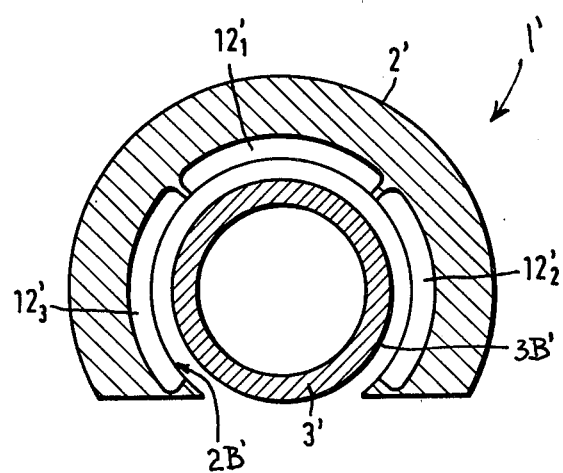
FIG. 5 is a transverse sectional view of a modified calender roll wherein a portion of the rotary cylindrical component is surrounded by the supporting component.

FIG. 5 illustrates a portion of a modified calender roll 1'. The rotary component 3' of this roll is a hollow or solid cylinder which is partially surrounded by a hollow stationary supporting component 2'. The cross-section of the component 2' resembles a horseshoe. The coils $12_1'$, $12_2'$ and $12_3'$ are provided in grooves (not specifically identified) which are machined into the internal surface 2B' of the supporting component. In this embodiment of the calender roll, the carrying coils $12_1'$ are disposed above the apex of the rotary cylinder 3'. In all other respects, the mode of operation and the construction of the roll 1' are identical with or respectively analogous to the mode of operation and design of the calender roll 1. The antifriction bearings (if any) are disposed between the peripheral surface 3B' of the cylinder 3' and the end portions of the internal surface 2B' of the supporting component 2'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. The combination comprising:
   (a) a pair of components including a stationary component and a rotary component, one of said components surrounding at least a portion of the other of said components;
   (b) magnet means on a selected component of said pair and operative to generate electromagnetic forces when direct current is supplied thereto, said magnet means including a plurality of pole faces arranged next to one another in axial direction of said selected component, and each of said pole faces comprising a plurality of sections extending in circumferential direction of said rotary component, each of said pole faces substantially entirely circumscribing said selected component and having a single polarity, and said pole faces being arranged such that neighboring pole faces have different polarities; and
   (c) supply means for supplying direct current to said magnet means, said supply means being arranged so that one section of each of said pole faces is excitable independently of the remainder of the respective pole face.

2. The combination of claim 1, wherein said rotary component constitutes the cylinder of a calender roll.

3. The combination of claim 1, wherein said stationary component is surrounded by said rotary component.

4. The combination of claim 1, wherein said stationary component surrounds at least a portion of said rotary component.

5. The combination of claim 1, further comprising bearing means interposed between said components.

6. The combination of claim 1, wherein said rotary component consists at least in part of magnetizable material.

7. The combination of claim 1, wherein said selected component is said stationary component.

8. The combination of claim 1, wherein said rotary component is cylindrical and defines an arcuate air gap with said stationary component, said pole faces being arcuate in circumferential direction of said components.

9. The combination of claim 7, wherein said stationary component constitutes the core of said magnet means, said magnet means including a plurality of coils which respectively surround a portion of said stationary component.

10. The combination of claim 1, wherein the sections of each of said pole faces are spaced from one another.

11. The combination of claim 7, said magnet means comprising a plurality of coils; and wherein the surface of said stationary component is provided with grooves for accommodating said coils.

12. The combination of claim 10, further comprising magnetic bridges interposed between the sections of each of said pole faces.

13. The combination of claim 11, wherein said grooves include first grooves extending in the circumferential direction of said rotary component and second grooves extending in substantial parallelism with the axis of said rotary component.

14. The combination of claim 11, wherein said grooves include a plurality of neighboring arcuate grooves extending in the circumferential direction of said rotary component and additional grooves extending between and communicating with pairs of neighboring arcuate grooves.

15. The combination of claim 14, wherein each of said coils has portions extending into portions of two neighboring arcuate grooves and into two additional grooves between such neighboring grooves.

16. The combination of claim 15, wherein each of said coils surrounds one of said sections.

17. The combination of claim 14, wherein each of said additional grooves confines portions of several coils.

18. The combination of claim 17, further comprising magnetic retaining means for the coil portions in said additional grooves.

19. The combination of claim 14, wherein three additional grooves are provided between each pair of neighboring arcuate grooves.

20. The combination of claim 19, said rotary component exhibiting a tendency to flex in such a manner that portions of its axis move in a predetermined plane; and wherein each of said pole faces includes three sections and each of said sections is surrounded by a discrete coil, said coils defining a first row in which each coil has two halves which are mirror symmetrical to one another with reference to said plane, and said coils further defining two additional rows which flank said first row.

21. The combination of claim 14, wherein said coils define several rows extending in substantial parallelism with the axis of said rotary component and the coils of at least one of said rows constitute a plurality of groups, said supply means being operative to energize the coils of at least two of said groups independently of one another.

22. The combination of claim 14, wherein said coils define a plurality of rows extending in substantial parallelism with the axis of said rotary component, said supply means being operative to energize the coils of at least two of said rows independently of one another.

23. The combination of claim 14, said rotary component exhibiting a tendency to flex in such a manner that portions of its axis move in a predetermined plane; and wherein said coils define a plurality of rows extending in substantial parallelism with said axis, said rows including a first row in which each coil has two halves which are mirror symmetrical to each other with reference to said plane, and said rows further including two additional rows which flank said first row, said supply means being operative to energize the coils of said first row and the coils of said additional rows independently of one another.

24. The combination of claim 23, wherein said supply means includes means for energizing the coils of each of said rows independently of each other.

25. The combination of claim 1, wherein said components have parallel axes.

26. The combination of claim 25, wherein the axis of said rotary component is located at a level above the axis of said stationary component.

27. The combination of claim 1, wherein one of said components is a paraboloid and has a concave surface.

28. The combination of claim 27, said stationary component constituting said paraboloid, and said rotary component exhibiting a tendency to flex in such a manner that portions of its axis move in a predetermined plane, said components defining a gap with one another; and wherein said magnet means includes coils and the latter define a row extending in substantial parallelism with said axis, said coils being halved by said plane, and said supply means being operative to energize said coils in such a manner that the width of that portion of said gap which is adjacent to said row is at least substantially constant when said coils are energized.

29. The combination of claim 28, wherein said coils form several groups and said supply means includes means for energizing the coils of at least two of said groups independently of each other.

30. The combination comprising:
 (a) a stationary component;
 (b) a rotary component consisting at least in part of magnetizable material, one of said components surrounding at least a portion of the other of said components, and said one component having an internal surface while said other component has an external surface which is spaced from and surrounded by said internal surface and defines an arcuate air gap with the same, said surface of said stationary component being provided with a plurality of neighboring arcuate grooves extending in the circumferential direction of said rotary component and with additional grooves extending between and communicating with pairs of neighboring arcuate grooves;
 (c) magnet means on said stationary component, said magnet means including neighboring arcuate pole faces, and each of said pole faces extending in the circumferential direction of said rotary component and comprising a plurality of discrete sections which are separated from one another by the respective additional grooves, the polarity of each pole face being different from that of each neighboring pole face, said magnet means further including a plurality of coils accommodated in said grooves, and each of said coils surrounding a discrete section of a pole face;
and
 (d) split magnetic retaining means in said additional grooves, said retaining means defining clearances between neighboring sections of the respective pole faces.

* * * * *